(12) United States Patent
Kim et al.

(10) Patent No.: US 7,809,800 B2
(45) Date of Patent: Oct. 5, 2010

(54) METHOD FOR PROVIDING THE LOCATION INFORMATION ON A MOBILE STATION BASED ON DBM AND TCP/IP

(75) Inventors: Ki Mun Kim, Incheon (KR); Sang Yun Lee, Kyungki-do (KR); Hee Hyeok Hahm, Seoul (KR); Young Ahn Ryu, Kyungki-do (KR); Young Ho Joo, Kyungki-do (KR); Jae Young Ju, Kyungki-do (KR)

(73) Assignee: SK Telecom Co., Ltd., Seoul (KR)

( * ) Notice: Subject to any disclaimer, the term of this patent is extended or adjusted under 35 U.S.C. 154(b) by 1269 days.

(21) Appl. No.: 10/668,086

(22) Filed: Sep. 22, 2003

(65) Prior Publication Data

US 2005/0021769 A1 Jan. 27, 2005

(30) Foreign Application Priority Data

Apr. 11, 2003 (KR) ...................... 10-2003-0022916

(51) Int. Cl.
*F06F 15/16* (2006.01)
*H04W 24/00* (2009.01)

(52) U.S. Cl. ........................ 709/217; 709/218; 709/219; 709/228; 455/456.3

(58) Field of Classification Search ................. 709/217, 709/218, 219, 228
See application file for complete search history.

(56) References Cited

U.S. PATENT DOCUMENTS

| | | | | |
|---|---|---|---|---|
| 6,014,090 A | * | 1/2000 | Rosen et al. ................. | 340/905 |
| 6,163,701 A | * | 12/2000 | Saleh et al. ............... | 455/456.2 |
| 6,246,882 B1 | * | 6/2001 | Lachance ................. | 455/456.4 |
| 6,259,923 B1 | * | 7/2001 | Lim et al. ................. | 455/456.2 |
| 6,295,454 B1 | * | 9/2001 | Havinis et al. ........... | 455/456.3 |
| 6,539,237 B1 | * | 3/2003 | Sayers et al. ................. | 455/555 |
| 6,677,894 B2 | * | 1/2004 | Sheynblat et al. ........ | 342/357.1 |
| 6,716,101 B1 | * | 4/2004 | Meadows et al. ........ | 455/456.1 |
| 6,993,359 B1 | * | 1/2006 | Nelakanti et al. ........ | 455/554.1 |
| 7,469,142 B2 | * | 12/2008 | Nelakanti et al. ........... | 455/436 |

* cited by examiner

*Primary Examiner*—William C Vaughn, Jr.
*Assistant Examiner*—Umar Cheema
(74) *Attorney, Agent, or Firm*—Lowe Hauptman Ham & Berner LLP

(57) ABSTRACT

The present invention presents a method for providing the location information of a mobile station(MS) by selectively using a DBM-based method and a TCP/IP-based method on a global positioning system(GPS) in a mobile telecommunication network constituted of a client server, a mobile positioning center(MPC), a home location register(HLR), and a position determination Entity(PDE).

By selectively using a DBM-based method or a TCP/IP-based method according to the type of requested service, the present invention enables to reduce the time required for obtaining the accurate location. Moreover, it can provide the requested location based service(LBS) on an MS even when the MS is on-line or on stand-by mode.

26 Claims, 3 Drawing Sheets

METHOD FOR PROVIDING THE LOCATION INFORMATION ON A MOBILE STATION BASED ON DBM AND TCP/IP

BACKGROUND OF THE INVENTION

1. Field of the Invention

The present invention relates to a method for providing the location information of a mobile station(MS) based on DBM (Data Burst Message) and TCP/IP(Transmission Control Protocol/Internet Protocol) for location based service(LBS) provided in a mobile telecommunication network. According to the present invention, when a request for the location information of an MS is being received by a client server, the client server selects a method among a method using DBM and a method using TCP/IP, receives the location information of the MS by the selected method, and provides the information to the user.

2. Description of the Related Art

In the prior art, location based services have been provided using various types of methods for providing the location information of an MS. The earliest method provided in the prior art is a method of providing the location information based on cells. In this method, the location information is provided by being based on the location of a base station where the MS is being located. In other words, a location information providing service based on cells provides location information with an accuracy of base station radius range. That is, the location information of an MS is provided with an error range of the base station radius, and thus the error range is large so that it cannot be used for the case of accurate location information being required.

To overcome the disadvantages of a cell-based method described above and to provide an accurate location information, a global positioning system(GPS)-based method has been introduced. A GPS-based method provides a location information by using a satellite so that it can provide an accurate location information of the requested mobile station, and thus it enables to provide various location information services.

With being applied to MS and mobile communication network, GPS enables to obtain the location of an MS quickly and accurately. There are two different types of methods, a DBM-based method and a TCP/IP-based method, for receiving the location information of an MS by using GPS on a mobile communication network.

First, looking into a DBM-based method, a positioning determination entity(PDE) communicates with an MS by a short message service(SMS) based on IS-801-1 standard to obtain the location information of the MS. This type of DBM-based method has an advantage of a wide service range since LBS can be provided even when a user is on-line or on stand-by mode. However, since it obtains the location information of an MS by SMS-based communication, numbers of SMS have to be transmitted/received between the PDE and the MS due to the limit of data transmission capacity, that is, the basic limit of SMS. And thus, it has a disadvantage that it takes comparatively long time to obtain the location information of an MS.

In the other method, i.e. a TCP/IP-based method, a positioning determination entity(PDE) communicates with an MS using a TCP/IP to obtain the location information of the MS. Since there is no capacity limit for data transfer in a TCP/IP-based method, the required time for obtaining the location information of an MS is short. However, since a simultaneous voice and data(SVD) service is not yet realized, it has a disadvantage that the on-talking call is hung up when the MS is on-line.

SUMMARY OF THE INVENTION

The present invention is proposed to solve the problems of the prior art mentioned above. It is therefore the object of the present invention to provide a method for providing the location information of an MS quickly and accurately by flexibly combining a DBM-based method and a TCP/IP-based method into GPS-based LBS on a mobile telecommunication network.

To achieve the object mentioned above, the present invention provides a method for providing the location information of an MS by selectively using a DBM-based method and a TCP/IP-based method based on GPS in a mobile telecommunication network constituted of a client server, a mobile positioning center(MPC), a home location register(HLR), and a position determination Entity(PDE).

The method in accordance with the present invention is characterized in that: when a location information is being requested to a client sever from a user's terminal, the client sever authenticates the request and decides to select a method, a DBM-based method or a TCP/IP-based method; then, in case of a TCP/IP-based method being selected, the client case sever sends a URL(uniform resource locator) of PDE to MS and obtains the user information from HLR through MPC, and in case of a DBM-based method being selected, the client server directly obtains the user information from HLR through MPC; and then PDE obtains the location information of the MS by the communication method, between PDE and MS, decided by the client sever and transmits the information to the client server through MPC.

DESCRIPTION OF THE NUMERALS ON THE MAIN PARTS OF THE DRAWINGS

10: an LCS client(a client sever)
20: a mobile positioning center(MPC)
30: a home location register(HLR)
40: a position determination entity(PDE)
60: a mobile station(MS).

DETAILED DESCRIPTION OF THE EMBODIMENTS

Hereinafter, referring to appended drawings, the structures and operation principles of the present invention are described in detail.

Figure 1:
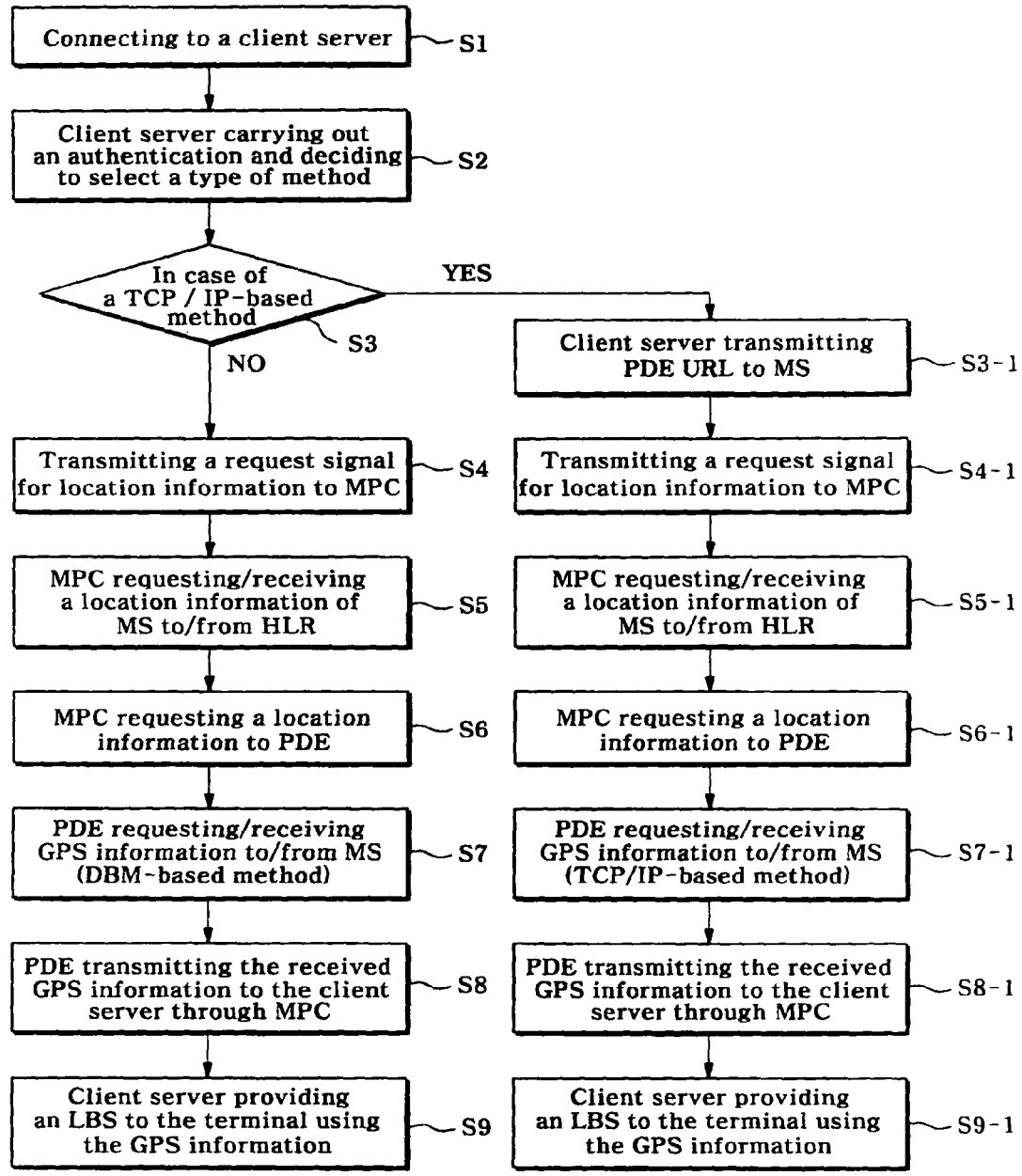
FIG. 1 is a flowchart illustrating the procedures of a method for providing the location information of a mobile station based on DBM and TCP/IP in accordance with the present invention.
Figure 2:
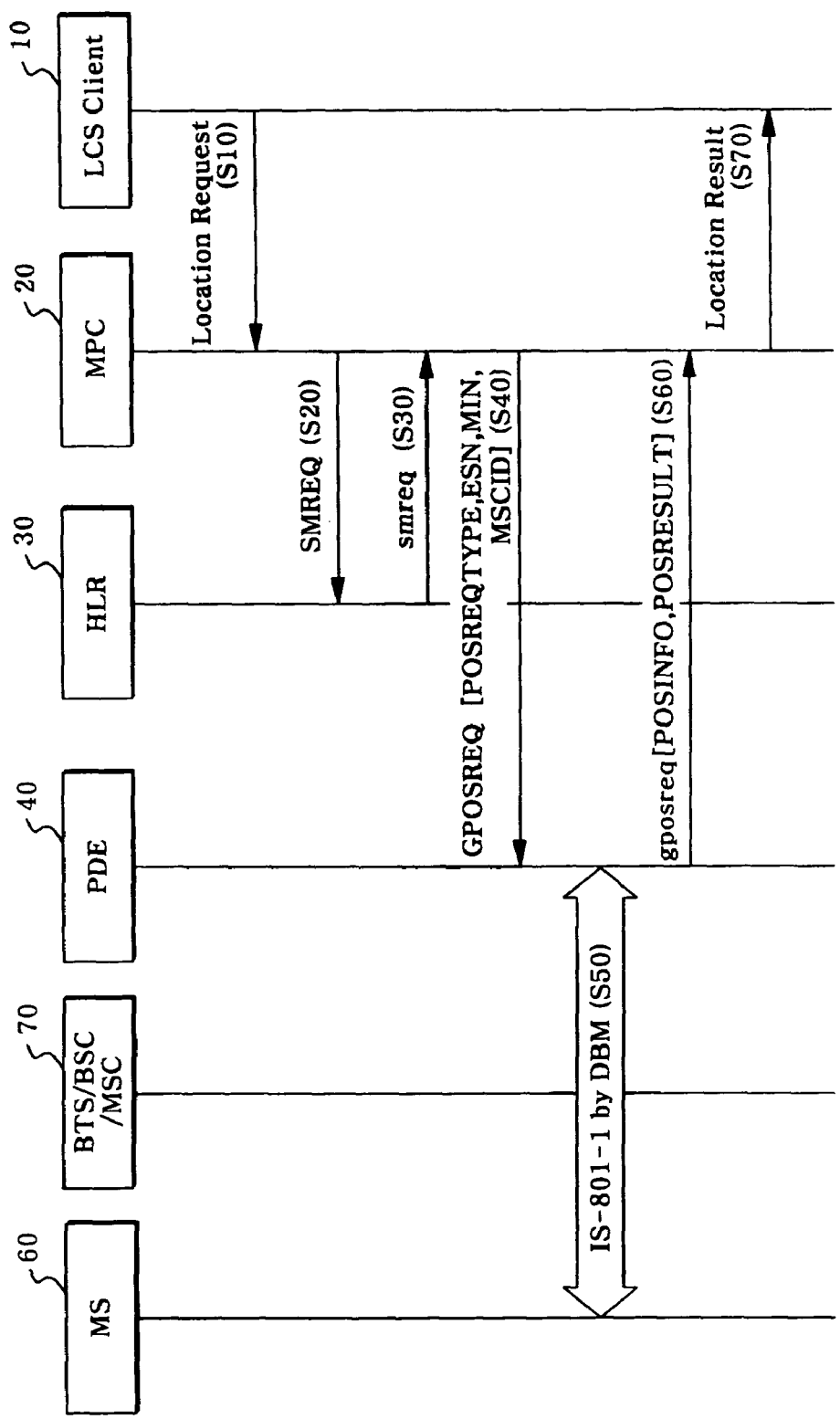
FIG. 2 is a view illustrating the message flow in the case of using a DBM-based method for providing the location information of a mobile station in accordance with the present invention.
Figure 3:
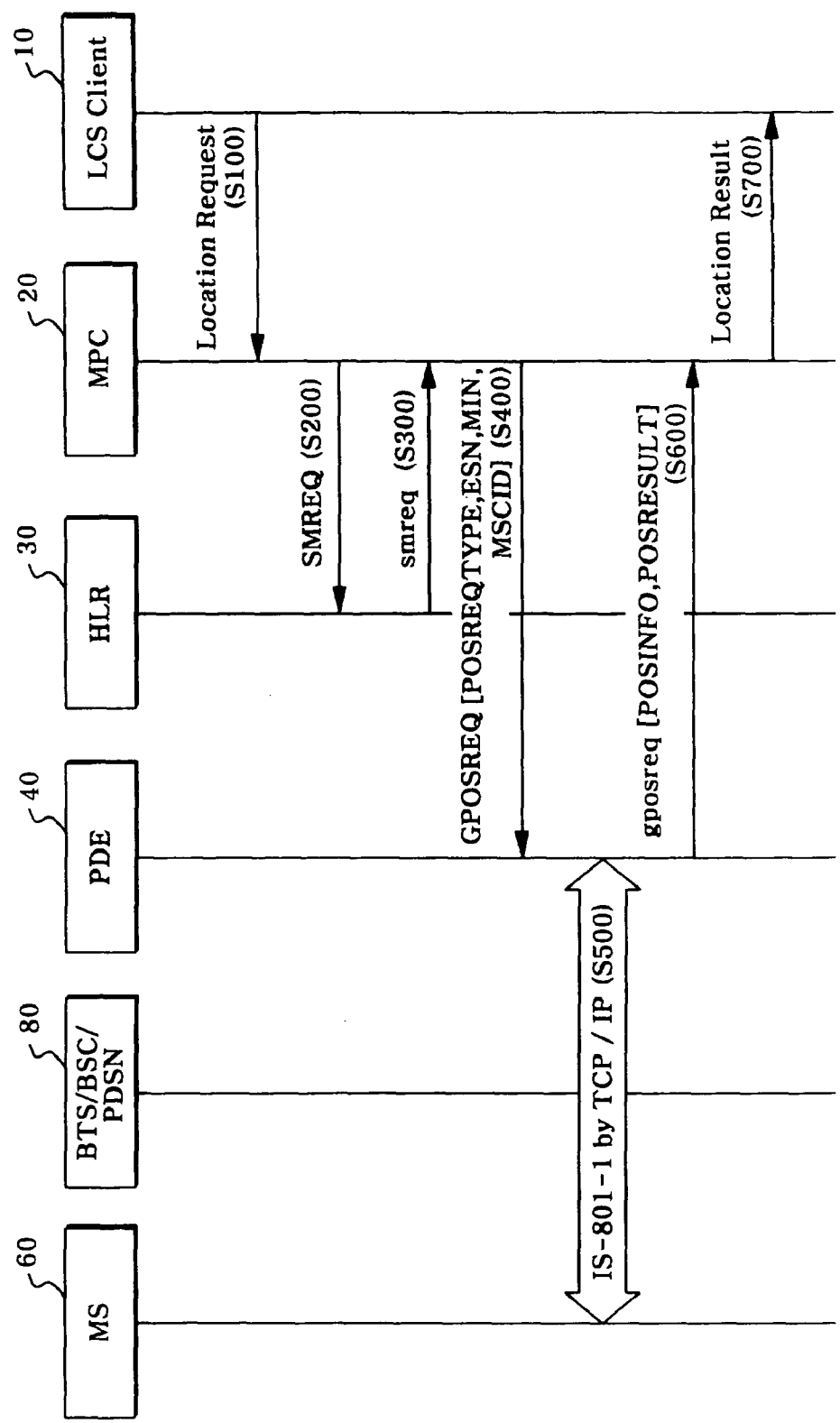
FIG. 3 is a view illustrating the message flow in the case of using a TCP/IP-based method for providing the location information of a mobile station in accordance with the present invention.

FIG. 1 is a flowchart illustrating the procedures of a method for providing the location information of a mobile station based on DBM and TCP/IP in accordance with the present invention, FIG. 2 is a view illustrating the message flow in the case of using a DBM-based method for providing the location information of a mobile station in accordance with the present invention, and FIG. 3 is a view illustrating the message flow in the case of using a TCP/IP-based method for providing the location information of a mobile station in accordance with the present invention.

Referring to the flowchart described in FIG. 1, the present invention presents a method for providing the location information of an MS by selectively using a DBM-based method and a TCP/IP-based method based on GPS in a mobile telecommunication network comprising the steps of: a user connecting to a client sever using a terminal; the client sever carrying out a user authentication and deciding to select a method among a DBM-based method and a TCP/IP-based method; in case of a TCP/IP-based method being selected, the client sever transmitting a PDE URL to MS and sending a location information request signal, containing the information of TCP/IP-based method being selected, to MPC, and in case of a DBM-based method being selected, the client sever sending a location information request signal, containing the information of DBM-based method being selected, to MPC; the MPC transmitting a request signal for MSC(Mobile Switching Center) information of the MS to HLR and receiving the response; after receiving the response, the MPC sending a location information request signal, containing the information on the MSC and the selected type of method, to PDE; the PDE obtaining the location information of the MS from the MS by the selected type of method; and the PDE transmitting the obtained location information of the MS to the client sever through MPC.

Looking into more details for each step, a user connects to a client server(10) on a mobile communication network using a terminal(not described in the figure) and requests a location information by specifying an MS(60) whose location is to be searched(S1). At this time, the terminal is connected to the client server on a mobile communication network using a wireless application protocol(WAP) or the like, and thus any type of terminal able to use WAP, such as a cellular phone or a personal digital assistant(PDA), can be the user's terminal.

When a terminal requests a location information to the client server(10) by specifying an MS(60) as described above, the client server(10) authenticates the terminal and the requested service and decides the type of method, a DBM-based method or a TCP/IP-based method, by which the location information service is to be provided(S2).

Here, the authentication on the terminal and the requested service means the authentication for availability and admission, and when the corresponding service is not available or the user has no admission for the corresponding service, the service providing procedure is terminated.

The reference for a client server(10) deciding the type of method can be varied according to the system design. In an embodiment of the present invention, the client server(10) provides the service using a TCP/IP-based method if the terminal requesting for the location information is identical to the MS(60) whose location information is to be searched, and otherwise, it provides the service using a DBM-based method.

The reason for using the reference described above is as follows: (i)in case of using a TCP/IP-based method, if the MS being searched is on-line, the on-talking call of the MS is hung up until a simultaneous voice and data(SVD) service is implemented on a mobile station, and (ii)in case of providing the location information using a TCP/IP-based method, the client server has to make the MS call back by sending the URL of PDE to the MS; and in this case, since the terminal(i.e., the MS to be searched) is already being connected to the client server for requesting the location information, the client server can send the URL of PDE through the communication channel already being connected.

Other references different from the reference described above can be also used, and instead of sending the URL of PDE through the communication channel already being connected, the client server can use another communication channel or SMS for sending the URL of PDE.

After the authentication and the decision for service providing method is being carried out by the client server(10) as described above, if the client server(10) decides to use a TCP/IP-based method, it transmits the URL of PDE(40) to the MS(60)(S3-1), sends a location request signal containing the information of TCP/IP-based method being selected to MPC(20) (S4-1). If a DBM-based method being selected, the client server(10) sends a location request signal containing the information of DBM-based method being selected to MPC(20) (S4).

Referring to FIG. 1, in case of a TCP/IP-based method being selected, the step(S3-1) of the client server(10) transmitting the URL of PDE(40) to the MS(60) is described to be carried out before the step(S4-1) of sending a location request signal containing the information of TCP/IP-based method being selected to MPC(20). However, the step of (S3-1) and the step of (S4-1) can be carried out simultaneously, or the step of (S4-1) can be carried out before the step of (S3-1).

The reason for transmitting the URL of PDE(40) to the MS(60) in the step of (S3-1) as described above is because: when PDE(40) is obtaining a GPS information from the MS(60) in the step of (S7-1) or (S500) that will be described later, PDE(40) is not requesting the GPS information to the MS(60) in the first place but the MS(60) is connecting to PDE(40) beforehand by a call-back to the URL.

The URL of PDE(40) from the client server(10) can be transmitted to the MS(60) by various types of communication method. That is to say, it can be transmitted by SMS, however, when the location information is being provided by using a TCP/IP-based method in the embodiment of the present invention, the user's terminal is identical to the MS(60) to be searched, and thus the URL of PDE is transmitted to the MS through the communication channel through which the user's terminal is being connected to the client server by using WAP.

After the step of (S4) or (S4-1), the MPC(20) that received the location request signal transmits an SMREQ signal for requesting the information of the MS(60) to HLR(30) (S20, S200). The HLR(30) that received the SMREQ signal transmits an smreq signal, containing the response to the requested information, back to the MPC(20)(S30, S300).

After receiving the smreq signal from HLR(30), MPC(20) sends a GPOSREQ signal to PDE(40)(S40, S6, S6-1). A GPOSREQ signal contains the information on the decided type of service providing method and the information related to the MSC of the MS.

PDE(40) that received the GPOSREQ signal receives a GPS signal from the MS(60) by the type of method decided by the client server(S50, S500, S7, S7-1). Since the transmission/reception of GPS signal between PDE and MS is different from each other according to the type of decided method, it will be described in turn hereinafter.

First, the transmission/reception of GPS signal in a DBM-based method is carried out by SMS-based communication by which MS(60) transmits its GPS location information to PDE(40). In other words, by using an SMDPP(SMS Delivery Point to Point) message through BTS(Base Transceiver Station)/BSC(Base Station Controller)/MSC(Mobile Switching Center), PDE(40) is requesting a GPS location information to the MS(60), and the MS(60) is responding to the request. The transmission/reception of the information between PDE(40) and MS(60) in a DBM-based method described above complies with IS-801-1 standard.

On the other hand, the transmission/reception of GPS signal in a TCP/IP-based method is carried out by the communication established by the MS(60) connecting to PDE(40) using the URL of PDE transmitted to the MS(60) in the step of (S3-1) described above. In other words, the MS(60) that received the URL of PDE(40) is connecting to PDE(40) using a TCP/IP through BTS/BSC/PDSN(Packet Data Service Node), and then it transmits a GPS location information to PDE(40). Thus, different from a DBM-based method wherein PDE is exchanging the information with the MS by using SMS as soon as a GPOSREQ signal is being received, PDE(40) is waiting for a call-back, by using the URL of PDE, from the MS(60) even after receiving a GPOSREQ signal in a TCP/IP-based method. The transmission/reception of the information between PDE and MS in a TCP/IP-based method described above also complies with IS-801-1 standard just like in a DBM-based method.

For the step of MS(60) transmitting the GPS location information to PDE(40) after connecting to PDE(40), it can be designed that: MS(60) transmits the information as a response to the request for GPS location information from PDE(40); or MS(60) transmits the information after or as soon as it connects to PDE(40) using a call-back.

After receiving a GPS location information as described above, PDE(40) transmits a gposreq response signal containing the information to MPC(20)(S60, S600, S8, S8-1), and then MPC(20) transmits a location result signal to the client server(S70, S700, S8, S8-1). After receiving the location information of the MS, the client server provides an appropriate service to the user, by using the information, according to the type of service requested by the user(S9, S9-).

As mentioned thereinbefore, the present invention presents a method for providing the location information of an MS by selectively using a DBM-based method and a TCP/IP-based method based on GPS in a mobile telecommunication network comprising the steps of: a user connecting to a client sever using a terminal; the client sever carrying out a user authentication and deciding to select a method among a DBM-based method and a TCP/IP-based method; in case of a TCP/IP-based method being selected, the client sever transmitting a PDE URL to MS and sending a location information request signal, containing the information of TCP/IP-based method being selected, to MPC, and in case of a DBM-based method being selected, the client sever sending a location information request signal, containing the information of DBM-based method being selected, to MPC; the MPC transmitting a request signal for MSC(Mobile Switching Center) information of the MS to HLR and receiving the response; after receiving the response, the MPC sending a location information request signal, containing the information on the MSC and the selected type of method, to PDE; the PDE obtaining a GPS location information of the MS from the MS by the selected type of method; the PDE transmitting the obtained GPS location information to the client sever through the MPC; and the client server providing a corresponding service to the user by using the location information of the MS.

By selectively using a DBM-based method or a TCP/IP-based method according to the type of requested service, the present invention enables to reduce the time required for obtaining the accurate location. Moreover, it can provide LBS on an MS even when the MS is on-line or on stand-by mode.

Since those having ordinary knowledge and skill in the art of the present invention will recognize additional modifications and applications within the scope thereof, the present invention is not limited to the embodiments and drawings described above.

What is claimed is:

1. A method for providing the location information of a mobile station (MS) by selectively using a data burst message (DBM)-based method and a TCP/IP (Transmission Control Protocol/Internet Protocol)-based method based on a global positioning system (GPS) in a mobile telecommunication network, constituted of a client server, a mobile positioning center (MPC), a home location register (HLR), and a position determination Entity (PDE), comprising the steps of:

a terminal connecting to a client server for being provided a location based
service (LBS);
said client server carrying out an authentication and selecting one of a DBM-based method and a TCP/IP-based method, wherein said MS communicates said location information of said MS with said PDE via data burst messages in said DBM-based method, wherein said MS communicates said location information of said MS with said PDE via a TCP/IP network in said TCP/IP-based method;
in case of a TCP/IP-based method being selected, said client server transmitting a PDE URL to MS, and then sending an information by a signal to MPC; and in case of a DBM-based method being selected, said client server sending an information by a signal to MPC;
said MPC transmitting a request signal for the information of said MS to HL and receiving the response;
after receiving said response, said MPC transmitting a signal, containing the corresponding information, to PDE;
said PDE obtaining the location information of said MS from said MS by the selected type of method; and
said PDE transmitting the obtained location information of said MS to said client server through said MPC;
wherein said step of selecting one of said DBM-based method and said TCP/IP-based method includes said client server selecting said TCP/IP-based method if said terminal connected to said client server is identical to said MS whose location information is to be provided, and otherwise, said client server selecting said DBM-based method; and
wherein said corresponding information, contained in said signal being transmitted from said MPC to said PDE after said MPC receiving said response from said HLR, contains the information on the type of method selected by said client server and the information on the mobile switching center(MSC) controlling said MS.

2. A method for providing the location information of an MS by selectively using a DBM-based method and a TCP/IP-based method as claimed in claim 1,
wherein said terminal connecting to said client server is a terminal able to connect to a client server using a wireless application protocol(WAP) such as a cellular phone, a personal digital assistant(PDA), or the like.

3. A method for providing the location information of an MS by selectively using a DBM-based method and a TCP/IP-based method as claimed in claim 1,
wherein said step of transmitting a PDE URL to said MS in case of TCP/IP-based method being selected, said client server transmits said PDE URL to said MS through the communication line, using WAP, established already.

4. A method for providing the location information of an MS by selectively using a DBM-based method and a TCP/IP-based method as claimed in claim 1,
wherein said step of transmitting a PDE URL to said MS in case of TCP/IP-based method being selected, said client server transmits said PDE URL to said MS using a short message service(SMS).

5. A method for providing the location information of an MS by selectively using a DBM-based method and a TCP/IP-based method as claimed in claim 1,
wherein said signal, sent to said MPC, from said client server contains the information on the selected type of method for providing the service.

6. A method for providing the location information of an MS by selectively using a DBM-based method and a TCP/IP-based method as claimed in claim 1,
wherein said information of MS, requested by said MPC to said HLR, contains the number of said MS and the information on the mobile switching center (MSC) controlling said MS.

7. A method for providing the location information of an MS by selectively using a DBM-based method and a TCP/IP-based method as claimed in claim 1,
wherein said step of said PDE obtaining the location information of said MS from said MS by the selected type of method comprises the steps of:
in case that said selected type of method is a DBM-based method, said PDE that received said signal transmitted by said MPC requesting a GPS location information of said MS to said MS; and
said MS that received said request transmitting the GPS location information to said PDE.

8. A method for providing the location information of an MS by selectively using a DBM-based method and a TCP/IP-based method as claimed in claim 7,
wherein the transmission/reception of the information between said PDE and said MS is being carried out by SMS-based communication complying with IS-801-1 standard.

9. A method for providing the location information of an MS by selectively using a DBM-based method and a TCP/IP-based method as claimed in claim 1,
wherein said step of said PDE obtaining the location information of said MS from said MS by the selected type of method comprises the steps of:
in case that said selected type of method is a TCP/IP-based method, said MS that received a PDE URL from said client server connecting to said PDE by using said PDE URL; and
said MS that connected to said PDE providing its own GPS location information to said PDE.

10. A method for providing the location information of an MS by
selectively using a DBM-based method and a TCP/IP-based method as claimed in claim 9,
wherein said step of said MS that received a PDE URL from said client server connecting to said PDE by using said PDE URL includes the step of said PDE that received a signal transmitted by said MPC waiting for said connection by said MS.

11. A method for providing the location information of an MS by selectively using a DBM-based method and a TCP/IP-based method as claimed in claim 9,
wherein said step of said MS that connected to said PDE providing its own GPS location information to said PDE comprises the steps of:
said PDE requesting a GPS location information to said MS connected to said PDE; and
said MS providing the GPS location information to said PDE in response to said request.

12. A method for providing the location information of an MS by selectively using a DBM-based method and a TCP/IP-based method as claimed in claim 9,
wherein that the transmission/reception of the information between said PDE and said MS is being carried out by TCP/IP-based communication complying with IS-801-1 standard.

13. A method for providing the location information of an MS by selectively using a DBM-based method and a TCP/IP-based method as claimed in claim 1,
further comprising, after the step of said PDE transmitting the location information of said MS to said client server through said MPC, the step of providing a corresponding location based service(LBS) requested by said terminal connected to said client server by using said location information of said MS received by said client server.

14. A method for providing the location information of a mobile station (MS) by selectively using a data burst message (DBM)-based method and a TCP/IP (Transmission Control Protocol/Internet Protocol)-based method based on a global positioning system (GPS) in a mobile telecommunication network, constituted of a client server, a mobile positioning center (MPC), a home location register (HLR), and a position determination Entity (PDE), comprising the steps of:
a terminal connecting to a client server for being provided a location based service (LBS);
said client server carrying out an authentication and selecting a method among a DBM-based method and a TCP/IP-based method, wherein said MS communicates said location information of said MS with said PDE via data burst messages in said DBM-based method, wherein said MS communicates said location information of said MS with said PDE via a TCP/IP network in said TCP/IP-based method;
in case of a TCP/IP-based method being selected, said client server sending an information by a signal to MPC, and then transmitting a PDE URL to MS; and in case of a DBM-based method being selected, said client server sending an information by a signal to MPC;
said MPC transmitting a request signal for the information of said MS to HLR and receiving the response;
after receiving said response, said MPC transmitting a signal, containing the corresponding information, to PDE;
said PDE obtaining the location information of said MS from said MS by the selected type of method; and
said PDE transmitting the obtained location information of said MS to said client server through said MPC;
wherein said step of selecting one of said DBM-based method and said TCP/IP-based method, said client server selects said TCP/IP-based method if said terminal connected to said client server is identical to said MS whose location information is to be provided, and otherwise, said client server selects said DBM-based method; and
wherein said corresponding information, contained in said signal transmitted from said MPC to said PDE after said MPC receiving said response from said HLR, contains information on the type of method selected by said client server and the information on the mobile switching center(MSC) controlling said MS.

15. A method for providing the location information of an MS by selectively using a DBM-based method and a TCP/IP-based method as claimed in claim 14,
   wherein said terminal connecting to said client server is a terminal able to connect to a client server using a wireless application protocol(WAP) such as a cellular phone, a personal digital assistant(PDA), or the like.

16. A method for providing the location information of an MS by selectively using a DBM-based method and a TCP/IP-based method as claimed in claim 14,
   wherein said step of transmitting a PDE URL to said MS in case of TCP/IP-based method being selected, said client server transmits said PDE URL to said MS through the communication line, using WAP, established already.

17. A method for providing the location information of an MS by selectively using a DBM-based method and a TCP/IP-based method as claimed in claim 14,
   wherein said step of transmitting a PDE URL to said MS in case of TCP/IP-based method being selected, said client server transmits said PDE URL to said MS using a short message service(SMS).

18. A method for providing the location information of an MS by selectively using a DBM-based method and a TCP/IP-based method as claimed in claim 14,
   wherein said signal, sent to said MPC from said client server contains the information on the selected type of method for providing the service.

19. A method for providing the location information of an MS by selectively using a DBM-based method and a TCP/IP-based method as claimed in claim 14,
   wherein said information of MS, requested by said MPC to said HLR, contains the number of said MS and the information on the mobile switching center (MSC) controlling said MS.

20. A method for providing the location information of an MS by selectively using a DBM-based method and a TCP/IP-based method as claimed in claim 14,
   wherein said step of said PDE obtaining the location information of said MS from said MS by the selected type of method comprises the steps of:
   in case that said selected type of method is a DBM-based method, said PDE that received said signal transmitted by said MPC requesting a GPS location information of said MS to said MS; and
   said MS that received said request transmitting the GPS location information to said PDE.

21. A method for providing the location information of an MS by selectively using a DBM-based method and a TCP/IP-based method as claimed in claim 20,
   wherein the transmission/reception of the information between said PDE and said MS is being carried out by SMS-based communication complying with IS-801-1 standard.

22. A method for providing the location information of an MS by selectively using a DBM-based method and a TCP/IP-based method as claimed in claim 14,
   wherein said step of said PDE obtaining the location information of said MS from said MS by the selected type of method comprises the steps of:
   in case that said selected type of method is a TCP/IP-based method, said
   MS that received a PDE URL from said client server connecting to said PDE by using said PDE URL; and
   said MS that connected to said PDE providing its own GPS location information to said PDE.

23. A method for providing the location information of an MS by selectively using a DBM-based method and a TCP/IP-based method as claimed in claim 22,
   wherein said step of said MS that received a PDE URL from said client server connecting to said PDE by using said PDE URL includes the step of said PDE that received a signal transmitted by said MPC waiting for said connection by said MS.

24. A method for providing the location information of an MS by selectively using a DBM-based method and a TCP/IP-based method as claimed in claim 22,
   wherein said step of said MS that connected to said PDE providing its own GPS location information to said PDE comprises the steps of:
   said PDE requesting a GPS location information to said MS connected to said PDE; and
   said MS providing the GPS location information to said PDE in response to said request.

25. A method for providing the location information of an MS by selectively using a DBM-based method and a TCP/IP-based method as claimed in claim 22,
   wherein the transmission/reception of the information between said PDE and said MS is being carried out by TCP/IP-based communication complying with IS-801-1 standard.

26. A method for providing the location information of an MS by selectively using a DBM-based method and a TCP/IP-based method as claimed in claim 14,
   further comprising, after the step of said PDE transmitting the location information of said MS to said client server through said MPC, the step of providing a corresponding location based service(LBS) requested by said terminal connected to said client server by using said location information of said MS received by said client server.

* * * * *